United States Patent Office.

MORRIS B. MANWARING, OF BOSTON, MASSACHUSETTS, ASSIGNOR OF THREE-FOURTHS TO WILLIAM E. EASTMAN, OF LACONIA, NEW HAMPSHIRE.

CRACKER AND PROCESS OF MAKING SAME.

SPECIFICATION forming part of Letters Patent No. 518,891, dated April 24, 1894.

Application filed December 29, 1893. Serial No. 495,114. (No specimens.)

*To all whom it may concern:*

Be it known that I, MORRIS B. MANWARING, of Boston, Suffolk county, and State of Massachusetts, have invented a certain new and useful Improvement in Farinaceous Cakes and Crackers, of which the following is a specification.

I will describe my improvement in detail and then point out the novel features in the claims.

In preparing farinaceous cakes and crackers, embodying my improvement, I make the desired compound in the ordinary or any other suitable manner, by mixing together suitable ingredients. The farinaceous matter will be used in the form of flour, and with it will be mixed flavoring and sweetening materials and fatty matter, such as butter and lard. Eggs may or may not be used. I make no claim to originality in regard to the compound nor do I wish to be confined to any specific ingredients. The desired compound having been suitably prepared I bake the same to the proper extent, varying the degree of baking more or less with regard to the effects I desire to obtain. After the baking, I reduce the substance to the condition of crumbs, employing for this purpose any suitable means, such for example as a disintegrating mill or crushing rollers. The crumbs must be in condition to adhere after being pressed together. To secure this result, they must have incorporated with them binding material, and this must, of course, be in condition for uniting the crumbs. Dextrine will answer generally if in the proper condition. To enable it to fulfill the desired function, it is of the utmost importance that the whole mass be uniformly moistened, and to a very slight extent, for if not thus moistened, lumps will be formed, and if too moist, the product will be hard and heavy. The moistening may be done efficiently by means of a fine spray discharged from an atomizer, or other suitable appliance; or, where the dextrine need not be added in solution, steam may be allowed to permeate the mass; or, in the case just suggested the crumbs while cold may be placed in a moist atmosphere and so as to produce condensation. The crumbs will be delivered to molds and will be compressed therein so as to form cakes. Any suitable machinery may be employed for this purpose. While I do not wish to be confined to any specific pressure, I have found that a pressure of from about one hundred and fifty to three hundred pounds to the square inch well answers the purpose. But for the process of moistening which I have explained it would be necessary to employ a very much higher pressure.

By making cakes and crackers in the manner described they will be given a distinctively mottled appearance. If the baking is carried on so that the outer portions will be well browned, then of course the mixing of the crumbs of these outer portions with the lighter inner portions will produce a mottling. Another way of producing the mottling is to bake different portions of a mass of material to different thicknesses, thereby producing different tints and mixing the crumbs together. If portions of the mass are made of different thicknesses before baking, distinctive tintings will be obtained, even by baking all for the same length of time. The mottling might also be produced in colors by coloring different portions of the composition and after baking these portions, commingling the crumbs in various proportions, and, if desired, so that they will occupy definite positions.

Crumbs of different tints or colors may be used, and the crumbs may be separated by means of sieves of different meshes, and then the different sized crumbs may be mixed together so as to vary the proportions in which different colors or tints will appear in the finished cakes and crackers.

Different sides of cakes and crackers may by my improvement be tinted or colored distinctively; or different portions of a single side may be tinted or colored differently to delineate some fanciful design; or the tinting or coloring may run through from side to side. If desirable, the entire surface, or any portion or portions of the entire surface may be inlaid by coloring crumbs forming the body of a cake or cracker with other crumbs suitable for the inlaying. Preferably, where inlaying is done, the body of the cake or cracker will first be formed by compressing and afterward would be placed into a mold into which the inlaying material had previously been fed.

Among numerous advantages which result from my improvement I may mention that cakes and crackers may be made absolutely uniform; that they will not be liable to working or blistering and that being more compact and solid so as to offer less surface to the air, they are capable of preservation longer.

After the manufacture of the cakes and crackers in the manner described, they may advantageously be dried, as drying will preserve them against deterioration. The drying may be done in any convenient temperature, as for example, on trays in a drying room.

What I claim as my invention, and desire to secure by Letters Patent, is—

1. The process of making cakes or crackers, consisting in forming the desired farinaceous compound, baking the same, to form cake of ordinary consistency crumbling the baked compound, providing the crumbs with binding material and moisture and compressing the crumbs together, substantially as specified.

2. The process of making cakes or crackers, consisting in forming the desired compound, to form cake of ordinary consistency baking the same, crumbling the baked compound, providing the crumbs with binding material and with moisture applied in the form of spray or vapor so as to moisten the mass uniformly though but slightly, and in compressing the crumbs together, substantially as specified.

3. As an article of manufacture, a cake or cracker made of a baked granulated and compressed farinaceous compound, said cake or cracker having a mottled appearance, substantially as specified.

In testimony whereof I have signed my name to this specification in the presence of two subscribing witnesses.

MORRIS B. MANWARING.

Witnesses:
WILLIAM M. ILIFF,
WILLIAM A. POLLOCK.